US008155715B2

(12) United States Patent
Yang et al.

(10) Patent No.: US 8,155,715 B2
(45) Date of Patent: Apr. 10, 2012

(54) COVER MECHANISM AND ELECTRONIC DEVICE USING SAME

(75) Inventors: Mu-Wen Yang, Taipei Hsien (TW); Chih-Chiang Chang, Taipei Hsien (TW); Hai-Shen Feng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 829 days.

(21) Appl. No.: 12/233,762

(22) Filed: Sep. 19, 2008

(65) Prior Publication Data

US 2009/0270144 A1 Oct. 29, 2009

(30) Foreign Application Priority Data

Apr. 25, 2008 (CN) .......................... 2008 1 0301311

(51) Int. Cl.
*H04M 1/00* (2006.01)

(52) U.S. Cl. .................. 455/575.3; 455/575.1; 439/135; 429/97; 361/679.56

(58) Field of Classification Search ............... 455/575.1, 455/575.3, 575.8, 90.3, 95, 100, 128, 90.2; 439/135–139, 357, 358; 429/97; 361/679.56–679.57
See application file for complete search history.

(56) References Cited

U.S. PATENT DOCUMENTS 7,700,223 B2 * 4/2010 Ge et al. .......................... 429/97
7,796,381 B2 * 9/2010 Zuo et al. ................. 361/679.57

* cited by examiner

*Primary Examiner* — Nay A Maung
*Assistant Examiner* — Chung-Tien Yang
(74) *Attorney, Agent, or Firm* — Altis Law Group, Inc.

(57) ABSTRACT

An electronic device (100) using a cover mechanism (30) to cover its hole (14) of its housing (10) is described. The cover mechanism includes a cover (20) and a locking structure (11). The cover has a latching portion (23) and a locking portion (21), both of which include a resilient part. The locking structure is configured for associating with the locking portion and the latching portion. Thus, the cover is latched to the housing to cover the hole by deforming the resilient parts. After the cover is unlatched from the housing by a sudden pulling force, the locking portion still physically connects to the locking structure. After the cover is unlatched from the housing by a normal pulling force, the locking portion has no physically relationship with the locking structure.

15 Claims, 4 Drawing Sheets

COVER MECHANISM AND ELECTRONIC DEVICE USING SAME

BACKGROUND

1. Field of the Invention

The invention relates to cover mechanisms used in electronic devices.

2. Description of related art

Cover mechanisms usually include covers with locks. When the cover mechanisms are used in electronic devices (e.g., mobile phones), the covers are typically locked to the electronic devices by the locks and, used to cover holes through which the interfaces (e.g., universal serial bus (USB)) of electronic devices are exposed. However, pulling the cover from the electronic device by a sudden force risks the loss of the covers not physically connected to the electronic device.

Therefore, there is room for improvement within the art.

BRIEF DESCRIPTION OF THE DRAWINGS

Many aspects of the exemplary electronic device using the cover mechanism can be better understood with reference to the following drawings. These drawings are not necessarily drawn to scale, the emphasis instead being placed upon clearly illustrating the principles of the present electronic device using the cover mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
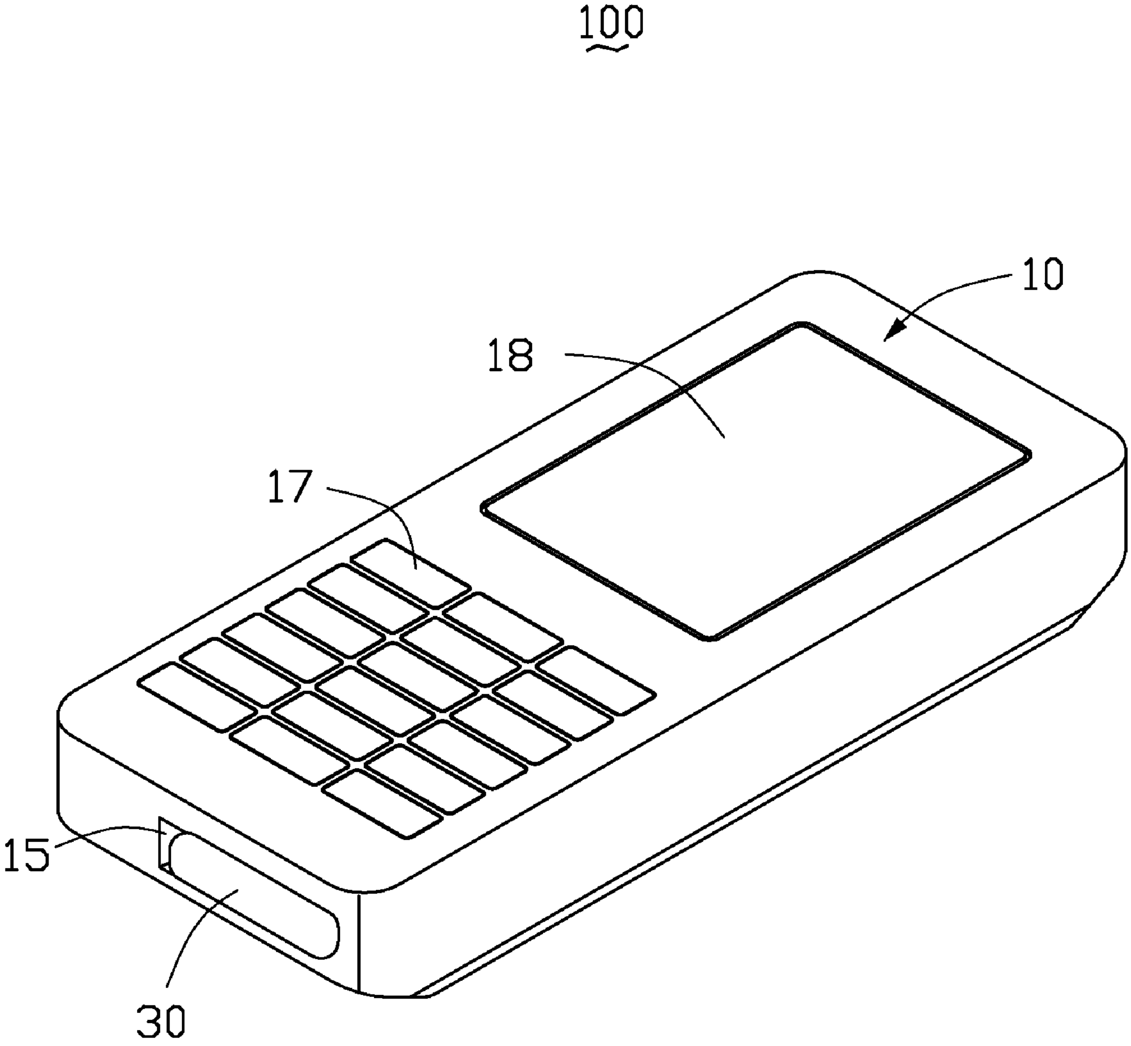
FIG. 1 is an isometric view of an electronic device including a cover mechanism according to an exemplary embodiment.

Referring to FIG. 1, an exemplary electronic device, e.g., mobile phone 100 can be seen including an enclosed housing 10, a keypad 17, a display 18, and a cover mechanism 30. The housing 10 defines a notch 15 facilitating the operation of the cover mechanism 30.

Figure 2:
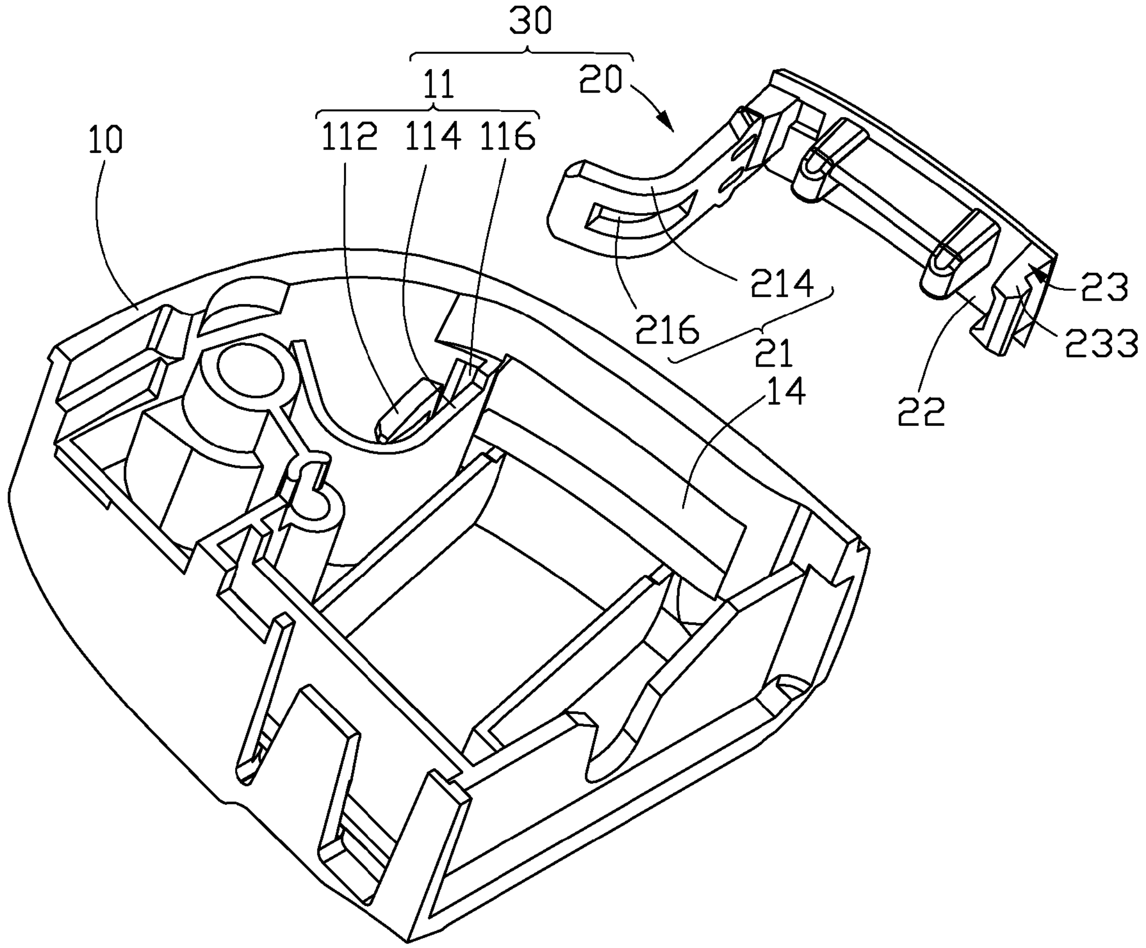
FIG. 2 is an isometric view of the cover mechanism shown in FIG. 1 at an opened state.

Referring to FIG. 2, the cover mechanism 30 includes a base portion (part of the housing 10 in this exemplary embodiment), a locking structure 11, and a cover 20.

Figure 3:
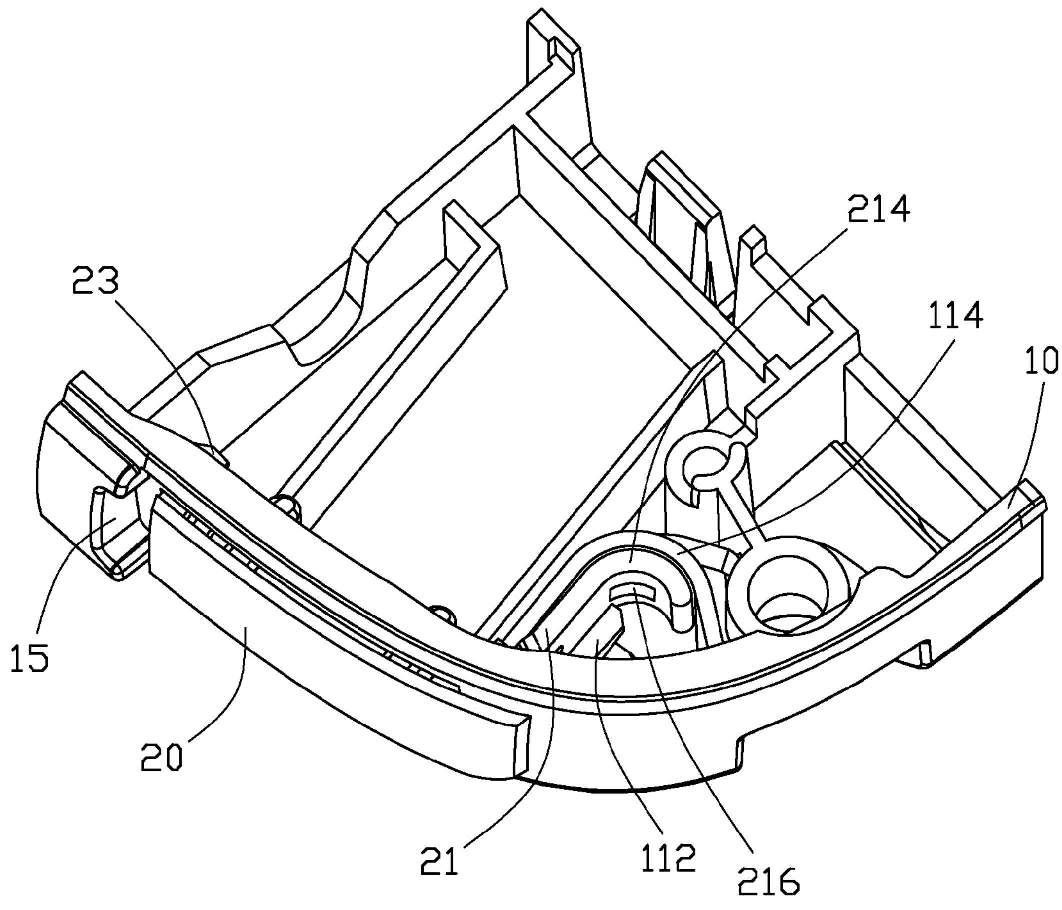
FIG. 3 is an isometric view of the cover mechanism shown in FIG. 1 at an closed state.

A base portion of housing 10 defines an hole 14, through which an interface (e.g., universal serial bus (USB)) of electronic devices may be exposed. The notch 15 is a cutout in the housing and located at one side of the hole 14 (FIG. 3). The base portion forms a catching portion 112 and a guiding portion 114 on it and at the other side of the hole 14 opposite to the notch 15. The two portions 112 and 114 are included in the locking structure 11 and protrude from an interior surface of the base portion within the enclosed space (not labeled) of the housing 10.

The guiding portion 114 is a curved element near the hole 14. The catching portion 112 is generally a pointed, straight structure adjacent to the guiding portion 114. The catching portion 112 points at a bottom of the guiding portion 114. A hole 116 is defined in the base portion and located between the catching portions 112 and the guiding portion 114.

The cover 20 has a locking portion 21 and a latching portion 23, both of which have resilient parts. The locking portion 21 and the latching portion 23 are formed on the same surface of a cover portion 22 of the cover 20. The locking portion 21 and the latching portion 23 are located at two opposite ends of the cover portion 22. The cover portion 22 corresponds to the hole 14 in shape and size, so the cover portion 22 can cover the hole 14 when the cover 20 is locked to the base portion. The locking portion 21 is generally sized and shaped for insertion through the hole 116. The locking portion 21 includes a bending part 214 and a catching hole 216. The bending part 214 is soft resilient (e.g. rubber) and configured to slide along the surface of the guiding portion 114 and not interfere with the catching portion 112. The catching hole 216 is defined in the bending part 214. The catching portion 112 is configured to pass through the catching hole 216.

The latching portion 23 is generally L-shaped including a latching end 233. The latching end 233 is resilient facilitating the latching the cover 20 with the housing 10.

Figure 4:
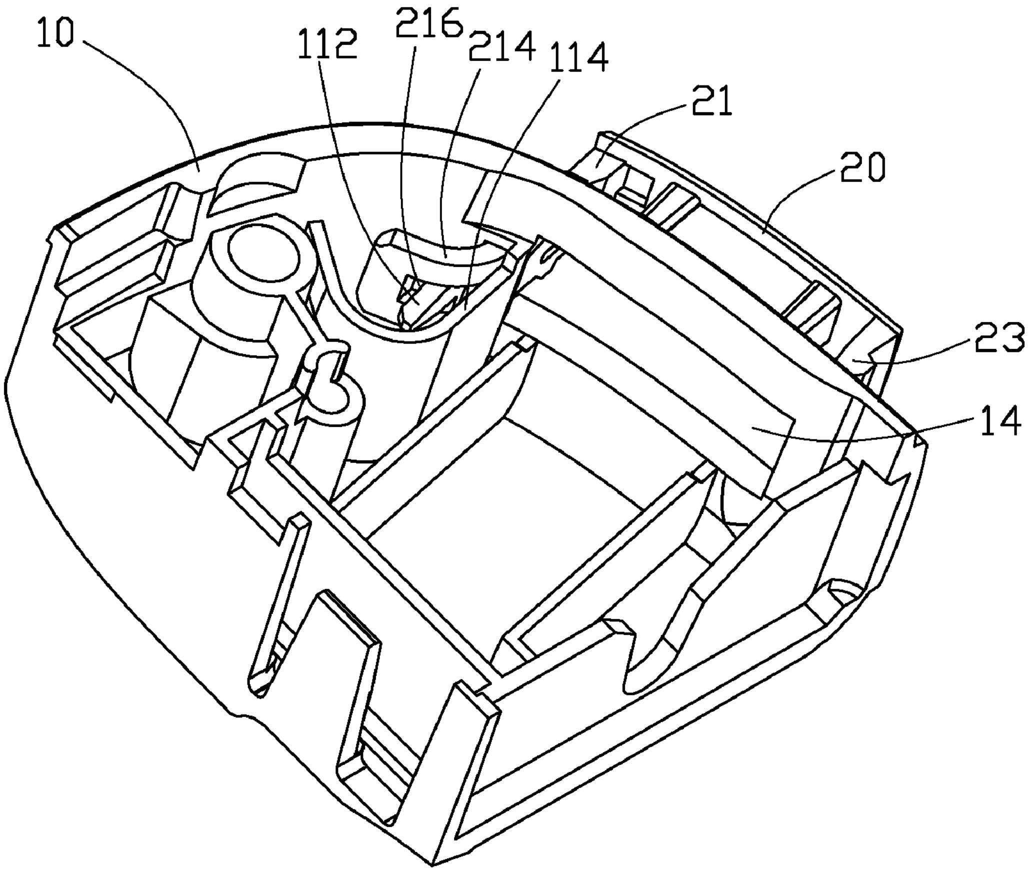
FIG. 4 is an isometric view of the cover mechanism shown in FIG. 1 at an emergency state.

FIGS. 2 and 3 show the cover mechanism 30 in an opened and a closed state, respectively. FIG. 4 shows an emergency state when the cover 20 is pulled by a sudden force away from the housing 10 from the closed state.

In the opened state, the cover 20 is detached from the housing 10. In the closed state, the cover 20 covers the hole 14. The latching portion 23 latches to the interior wall (not labeled) of the base portion. The locking portion 21 is deformed and received in the interior space of the housing 10. The locking portion 21 is positioned between the catching portion 112 and the guiding portion 114. The catching hole 216 is aligned with the catching portion 112. In the emergency state, the hole 14 is exposed while the cover 20 is still caught by a catching of the catching portion 112 with the locking portion 21.

When the cover mechanism 30 is moved from the opened state to the closed state, the locking portion 21 is pushed into the interior space of the housing 10 and positioned between the catching portion 112 and the guiding portion 114. During this stage, the bending part 214 passes through the hole 116 to be guided and deformed by the guiding portion 114 and, slides along the surface of the guiding portion 114 until the bending part 214 reaches a latched position (shown in FIG. 3). The latching of the latching end 233 to the interior wall of the housing 10 results from deformation and rebound of the latching end 233 relative to the interior wall.

When the cover mechanism 30 is moved from the closed state to the opened state, there is a need to deform the end of the cover 20 near the notch 15. The notch 15 facilities deformation of the cover 20. The cover 20 can be pulled by a normal pull force away from the housing 10.

When the cover 20 is pulled by a sudden force, the cover mechanism 30 will move to the emergency state from the closed state. During this process, the cover 20 quickly moves and, there is insufficient time for the deformed bending part 214 to rebound. At this time, the bending part 214 is hooked by the catching of the catching portion 112 within the catching hole 216. Accordingly, the cover 20 remains physically linked to the housing 10, thereby reducing the risk of being lost by the sudden pull.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover mechanism for covering a hole of a portable electronic device including a base portion, the cover mechanism comprising:

a cover having a latching portion and a locking portion formed thereon, the latching portion and the locking portion both comprising resilient parts;

a locking structure formed on the base portion and configured for associating with the locking portion and the latching portion, wherein:

in a closed state, the cover is latched to the base portion to cover the hole by deforming the resilient parts;

from the closed state to an emergency state, the cover is unlatched from the base portion by a sudden pulling force, and the resilient part of the locking portion insufficiently rebounds, the locking portion physically links to the locking structure;

from the closed state to an open state, the cover is unlatched from the base portion by a normal pulling force, and the resilient part of the locking portion sufficiently rebounds, no physical link between the locking structure and the cover is maintained.

2. The cover mechanism as claimed in claim 1, wherein:

the resilient part of the locking portion including a bending part, the bending part defining a catching hole; and the locking structure comprising a catching portion, the catching portion hooked into the catching hole after the cover is unlatched from the base portion by a sudden pulling force.

3. The cover mechanism as claimed in claim 2, wherein the locking structure further comprises a guiding portion, the guiding portion guiding and deforming the bending portion.

4. The cover mechanism as claimed in claim 3, wherein during guiding of the guiding portion, the bending portion slides along a surface of the guiding portion.

5. The cover mechanism as claimed in claim 3, wherein the guiding portion is a curved element and the catching portion protrudes towards a bottom of the guiding portion.

6. The cover mechanism as claimed in claim 5, wherein the locking structure further comprises a hole configured such that the bending portion passes through the hole into the base portion, then slides along a surface of the guiding portion and not interfere with the catching portion.

7. The cover mechanism as claimed in claim 5, wherein the locking structure further comprises a hole, the hole defined in the base portion, the guiding portion and the catching portion formed on the base portion, the hole positioned between the guiding portion and the catching portion.

8. The cover mechanism as claimed in claim 1, wherein the resilient part of the latching portion comprises a latching end, the locking structure comprising a sidewall of the hole, and the latching end latched with the sidewall.

9. An electronic device, comprising:

a housing defining an hole;

a cover mechanism, comprising:

a cover having a latching portion and a locking portion formed thereon, the latching portion and the locking portion both comprising resilient parts;

a locking structure formed on the housing and configured for associating with the locking portion and the latching portion, wherein:

in a closed state, the cover is latched to the base portion to cover the hole by deforming the resilient parts;

from the closed state to an emergency state, the cover is unlatched from the base portion by a sudden pulling force, and the resilient part of the locking portion insufficiently rebounds, the locking portion physically links to the locking structure;

from the closed state to an open state, the cover is unlatched from the base portion by a normal pulling force, and the resilient part of the locking portion sufficiently rebounds, no physical link between the locking structure and the cover is maintained.

10. The electronic device as claimed in claim 9, wherein:

the resilient part of the locking portion including a bending part, the bending part defining a catching hole; and the locking structure comprising a catching portion, the catching portion hooked into the catching hole after the cover is unlatched from the housing by a sudden pulling force.

11. The electronic device as claimed in claim 10, wherein the locking structure further comprises a guiding portion guiding and deforming the bending portion, the bending portion sliding along a surface of the guiding portion.

12. The electronic device as claimed in claim 11, wherein the guiding portion is a curved element and the catching portion protrudes towards a bottom of the guiding portion.

13. The electronic device as claimed in claim 12, wherein the locking structure further comprises a hole configured such that the bending portion passes through the hole into the housing, then slides along a surface of the guiding portion and not interfere with the catching portion.

14. The electronic device as claimed in claim 12, wherein the locking structure further comprises a hole, the hole defined in the housing, the guiding portion and the catching portion formed on the housing, the hole positioned between the guiding portion and the catching portion.

15. The electronic device as claimed in claim 9, wherein the resilient part of the latching portion comprises a latching end, the locking structure comprising a sidewall of the hole, and the latching end latched with the sidewall.

* * * * *